United States Patent
Wagner

(10) Patent No.: US 7,290,306 B2
(45) Date of Patent: Nov. 6, 2007

(54) DRIVE SYSTEM FOR A PIVOTABLE WINDSCREEN WIPER

(75) Inventor: Tobias Wagner, Hamburg (DE)

(73) Assignee: Magna Car Top Systems GmbH, Bietigheim-Bissingen (DE)

( * ) Notice: Subject to any disclaimer, the term of this patent is extended or adjusted under 35 U.S.C. 154(b) by 470 days.

(21) Appl. No.: 11/093,341

(22) Filed: Mar. 29, 2005

(65) Prior Publication Data

US 2005/0166348 A1    Aug. 4, 2005

Related U.S. Application Data

(63) Continuation of application No. PCT/EP2003/012999, filed on Nov. 20, 2003.

(30) Foreign Application Priority Data

Jan. 10, 2003   (DE)   ............... 103 00 837

(51) Int. Cl.
  *B60S 1/58* (2006.01)
  *B60S 1/16* (2006.01)
  *B60S 1/26* (2006.01)

(52) U.S. Cl. .............. 15/250.3; 15/250.31; 296/146.4; 296/146.8; 49/324

(58) Field of Classification Search ............... 15/250.3, 15/250.31, 250.16, 250.19, 250.001; 296/146.4, 296/146.8; 49/324
See application file for complete search history.

(56) References Cited

U.S. PATENT DOCUMENTS

| 2,392,230 | A |   | 1/1946  | Collins |
| 2,446,611 | A | * | 8/1948  | Rose ........................ 15/250.13 |
| 3,115,662 | A | * | 12/1963 | Thrap ....................... 15/250.16 |
| 3,505,702 | A |   | 4/1970  | Omlie et al. |
| 3,842,460 | A | * | 10/1974 | Wulf ........................ 15/250.27 |
| 3,893,203 | A | * | 7/1975  | Berkelius ................. 15/250.22 |
| 5,969,431 | A |   | 10/1999 | Miller et al. |

FOREIGN PATENT DOCUMENTS

DE     3536800 A1     4/1987

OTHER PUBLICATIONS

Kunsemuller, et al., "Wie Funktioniert das?" Das Auto, Bibliographisches Institut Mannheim/Zurich.

* cited by examiner

*Primary Examiner*—Gary K. Graham
(74) *Attorney, Agent, or Firm*—Brooks Kushman P.C.

(57) ABSTRACT

A drive arrangement for a pivoting windshield wiper of a vehicle is designed so that after decoupling the drive connection to the windshield wiper a rack situated in the drive for the windshield wiper can be used as drive element for an actuator that is independent of the windshield wiper.

11 Claims, 2 Drawing Sheets

DRIVE SYSTEM FOR A PIVOTABLE WINDSCREEN WIPER

CROSS-REFERENCE TO RELATED APPLICATION

This application is a continuation of PCT application Serial No. PCT/EP2003/012999, filed Nov. 20, 2003, to which priority is claimed.

FIELD OF THE INVENTION

The invention relates to a drive arrangement for a vehicle pivoting windshield wiper.

BACKGROUND ART

A drive device for pivoting windshield wipers is disclosed in the book: How Things Work: The Car published by Bibliographisches Institut, Mannheim/Zurich, 1968, page 248. This drive is a multiple-step spur gear drive, the driven gear of which is eccentrically connected to a toothed rack. The toothed rack meshes with a pinion of an output shaft. The output shaft is driven to perform a reciprocating movement on the output side of the windshield wiper motor that functions as a drive source. The position of the rack axis and hence the direction in which the rack extends varies according to the stroke similar to the connecting rod of a crank drive.

A drive arrangement of this type is disclosed in U.S. Pat. No. 5,969,431 A, in which a common motor-driven drive source, reversible in its direction of rotation, is provided for driving a vehicle pivoting windshield wiper and an additional mechanical actuator. A mechanism comprising a rack-and-pinion drive is arranged in the connection for the drive source of the vehicle windshield wiper. The connection is formed by a control magnet. The rack of the rack-and-pinion drive is linearly displaceable in the operating direction of the control magnet. The range of travel of the rack and pinion drive lying outside the range serving to drive the vehicle windshield wiper, forms an independent mechanical actuator decoupled from the windshield wiper drive. The windshield wiper assigned to the rear window of a tailgate is a pivoted rear window wiper. The tailgate lock is operated by the actuator, which has corresponding positional co-ordination or suitable mechanical reversals.

The object of the invention is to develop a drive arrangement of the aforementioned type with a view to possible wider applications.

SUMMARY OF THE INVENTION

According to one aspect of the invention, the independent range of travel of the toothed rack as it is decoupled from the windshield wiper drive acts as a hydraulic actuator. The hydraulic actuator comprises a master cylinder and a slave cylinder. The rack forms the drive element for a piston of the master cylinder. The choice of transmission in the drive between the rack and the drive shaft of the windshield wiper on the one hand, and of the actuator on the other, permits working with comparatively short lengths of travel of the rack for driving the windshield wiper. This results in small overall design dimensions. Using the rack as a drive element for the piston of the hydraulic actuator makes it possible to apply comparatively large control forces and achieve long control travel with small overall dimensions and correspondingly short control travel of the rack.

According to another aspect of the invention the drive source is in the form of an electric motor reversible in its direction of rotation. The reversible electric motor when provided with suitable choice of transmission ratio, can be of compact design construction, particularly where control of the rack is combined into one structural unit.

The drive arrangement for the windshield wiper drive may be independently used with other actuators to provide a non-powered drive connection to the respective actuator. In particular, a releasable drive connection may offer the advantage of avoiding drive losses. The releasable drive connection is especially well-suited to driving the windshield wiper and elements adjacent to this, for example, such as a tailgate, a trunk lid, adjacent roof parts or the like, owing to the short connecting distances.

Further details and features of the invention are set forth in the claims. The invention with further details will be further explained below with reference to an example of an embodiment.

DETAILED DESCRIPTION OF THE PREFERRED EMBODIMENT(S)

Figure 1:
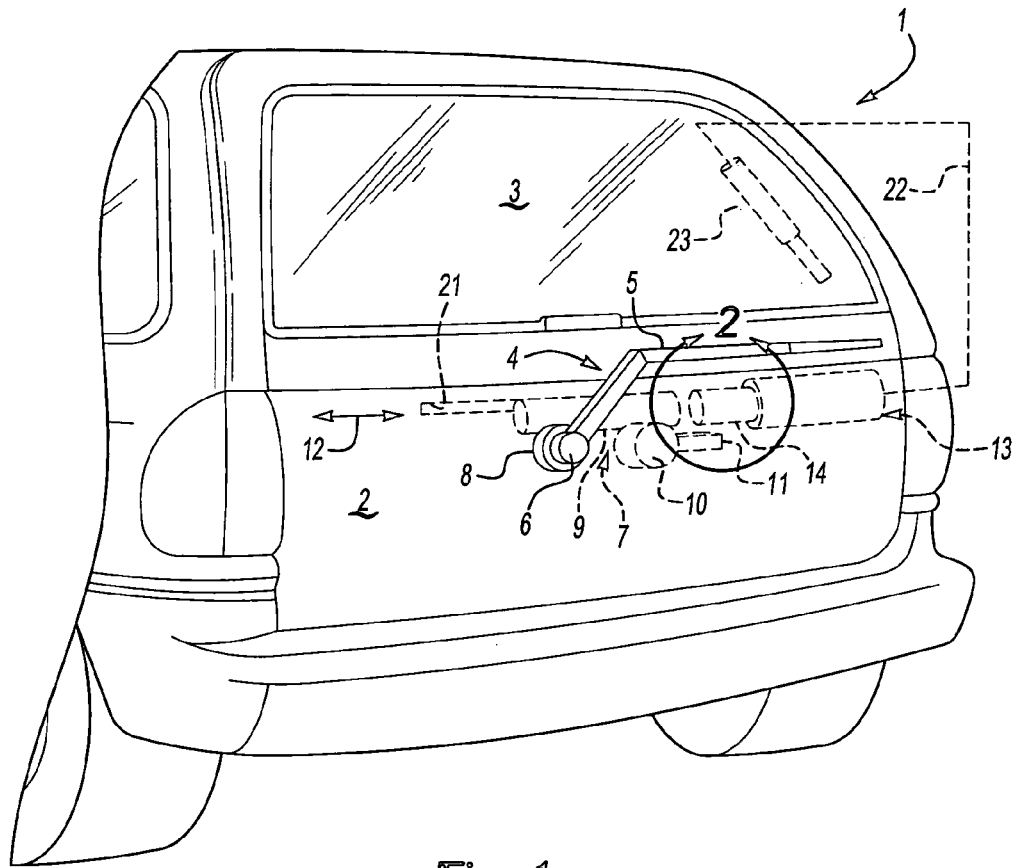
FIG. 1 shows a highly schematic representation of the tailgate of a vehicle with a rear window and a pivoting rear window wiper having a drive arrangement that is also designed to act upon an actuator for the tailgate.

The schematic representation according to FIG. 1 shows the tailgate 1 of a vehicle that has an upright closed position and a rearwardly swivelled open position. The tailgate 1 may be hinged to the vehicle in the area of its upper edge as indicated schematically by the dot-dash line. The tailgate 1 has a lower, closed part 2 and above this a rear window 3, to which a rear window wiper 4 is assigned. The wiper arm 5 of the wiper 4 is seated on a wiper shaft 6. The drive arrangement 7 associated with the wiper 4 is indicated symbolically and comprises a drive gear 8 that is concentric with the wiper shaft 6. The drive gear 8 is an integral part of a rack-and-pinion drive. A rack 9 meshes with a driven pinion 10 of an electric motor 11. The position of the rack 9 is fixed in its axis of travel, which is not shown. The rack is moveable in its travel as illustrated by the arrow 12. The electric motor 11 that is provided as drive source is reversible in its direction of rotation in the example of the embodiment of FIG. 1.

Figure 2:
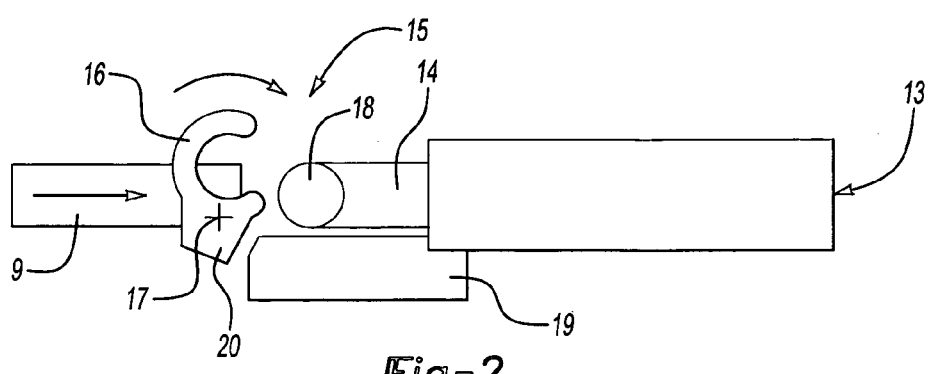
FIG. 2 shows an enlarged representation of the section II in FIG. 1.

A hydraulic cylinder 13 having a piston rod or a piston 14 extends from the rack 9, and is coaxial therewith in the example of the embodiment. FIG. 2 shows a mechanical coupling connection 15 between the piston 14 and the rack 9, in a decoupled state. The coupling connection 15 is formed by a rotary claw 16, which is arranged on the rack 9 so that it can pivot about an axis 17. A pin 18 is assigned as an opposing element at the free end of the piston rod 14. A guide block 19 is disposed in the range of travel of the piston rod 14 and also lies on the swivel travel of a projection 20 assigned to the rotary claw 16. The rotary claw 16 is swivelled into the position in which it impinges on the pin 18. When the rack 9 runs against the piston rod 14, the rack 9 may be coupled to the piston rod 14. A tilt guide on the block 19 forms a runway for the projection 20 that extends over the range of travel of the rack 9. The projection 20 is situated outside the engagement of the rack 9 with the drive gear 8. The projection 20 is decoupled from the rear window wiper 4 over the range of travel of the rack 9.

FIG. 1 illustrates that the rack 9 only runs into the coupled position with the piston rod 14 after leaving the engaged position with the drive gear 8. The coupling connection 15 is released when the rack 9 is connected in a driving relationship to the drive gear 8. The opening position forms the starting or normal position for the rotary claw 16. The opening position is set due to the weight ratios or due to appropriate biasing, for example by way of a spring (not shown).

A guide projection 21 is provided as an extension of the rack 9 at the opposite end of the rack 9 to the hydraulic cylinder 13. The guide projection 21 provides the necessary support and alignment. The counter-guide assigned to the guide projection 21 is omitted from the illustration.

The drive arrangement 7 alternatively serves to drive the windshield wiper 4 or to act upon the hydraulic cylinder 13. The rack 9 either engages the drive gear 8 or is coupled to the piston rod 14. The hydraulic cylinder 13 in the illustrated embodiment has the function of a master cylinder, which is connected by way of a line connection 22, schematically indicated by a dashed line, to a slave cylinder 23. The slave cylinder 23 is assigned to an actuator for opening and closing the tailgate 1. The support (not shown) for the slave cylinder 23 may be provided directly between the vehicle body and the tailgate 1. A corresponding linkage or gear connection may also be actuated by way of the slave cylinder 23.

In the representations according to FIGS. 1 and 2, a mechanical coupling connection 15 is provided. In the example of an embodiment according to FIGS. 3 and 4, a hydraulic coupling is shown. In the hydraulic coupling, the rack 9 of the cylinder-side end area forms a piston 24. The hydraulic cylinder provided as master cylinder 25 can thereby be operated virtually without any power input when driving the windshield wiper 4, provided that the cylinder volume 31 defined by the piston 24 and the cylinder surface 26 is openly connected to an equalizing reservoir 28. In the course of driving the windshield wiper 4, the piston 24 moves inside the range of travel 27. The cylinder volume 31 defined by the piston 24 inside the cylinder surface 26 is connected, within a transitional range, to the equalizing reservoir 28 via the connection cross-section 29 and to the slave cylinder 23 via the line 22. The reciprocating movements of the piston 24 within the range of travel 27 results in virtually no pressure build-up in the slave cylinder 23 because a corresponding volumetric compensation for the volume changes caused by the movements of the piston 24 within the range of travel 27 takes place via the equalizing reservoir 28.

The range of travel 27 corresponds to the range of movement of the rack 9. The windshield wiper 4 is driven and preferably pivoted when changing the swivel direction by reversing the direction of rotation of the motor 10.

After the rack 9 is decoupled from the drive gear 8, the piston 24 may be extended further into the master cylinder 25. A pressure build-up over the range of travel 32 results with corresponding pressurization of the slave cylinder 23 for raising the tailgate 1 once the piston 24 has shut off the connection cross-section 29, and assuming a cylinder surface 26 that is closed except for the connection of the line 22. The range of travel 32 extends close to the end of the master cylinder 25 opposite the piston 24, leaving a range of travel 33 for the adjustment of tolerances.

There is available travel basically corresponding to the range of travel 32, for lowering the tailgate 1 from the open position into the closed position. Through reversal of the motor 11, the tailgate 1 can be lowered into its closed position in a corresponding reversal of the direction of movement of the piston 24.

If when lowering the tailgate 1, the tailgate 1 is held in an intermediate position, for example due to a protruding item of baggage or the like, this will lead to the build-up of a negative pressure, unless a volume equalization can take place via the equalizing reservoir 28, as the rack 9 or the piston 24 continues to be driven in the direction corresponding to the closed position of the tailgate 1. In order to ensure this and provide a jamming safeguard, the range of travel 33 is covered by providing the cylinder surface 26 with a further line connection 34, to the equalizing reservoir 28. A check valve 35 is arranged to be closing in the direction of the equalizing reservoir 28 so that when the tailgate 1 is opened the pressure build-up required is not adversely affected.

The scope of the invention may also encompass decoupling the closing movement of the tailgate 1, from the stroke position of the piston 24 in a predefined range adjacent to the closed position. The closing movement is controlled by the motorized drive for the rack 9 or the piston 24. Control direction 36 of the piston 24 corresponds to the opening direction of the tailgate 1. A connection cross-section 30 to the equalizing reservoir 28 is provided in the control direction 36 downstream of the connection cross-section 29 and, an actuated valve 37. In particular the actuated valve 37 may be an electrically actuated non-return valve 37 that is being designed to close in the direction of the cylinder volume 31. If, the connection cross-section 30 is opened, when lowering the tailgate 1 into its closed position, a build-up of pressure through the correspondingly actuated valve 37 occurs in the direction of the equalizing reservoir 28. The tailgate 1 can fall essentially unbraked into its closed position, so that automatic locking, for example against the vehicle body, can be achieved, it being possible to operate with simple passive closures. The closing movement of the tailgate 1 is controlled by the movement of the piston 24 with the corresponding downward travel being shown by the range of travel 39 that follows the range of travel 38.

Figure 3:
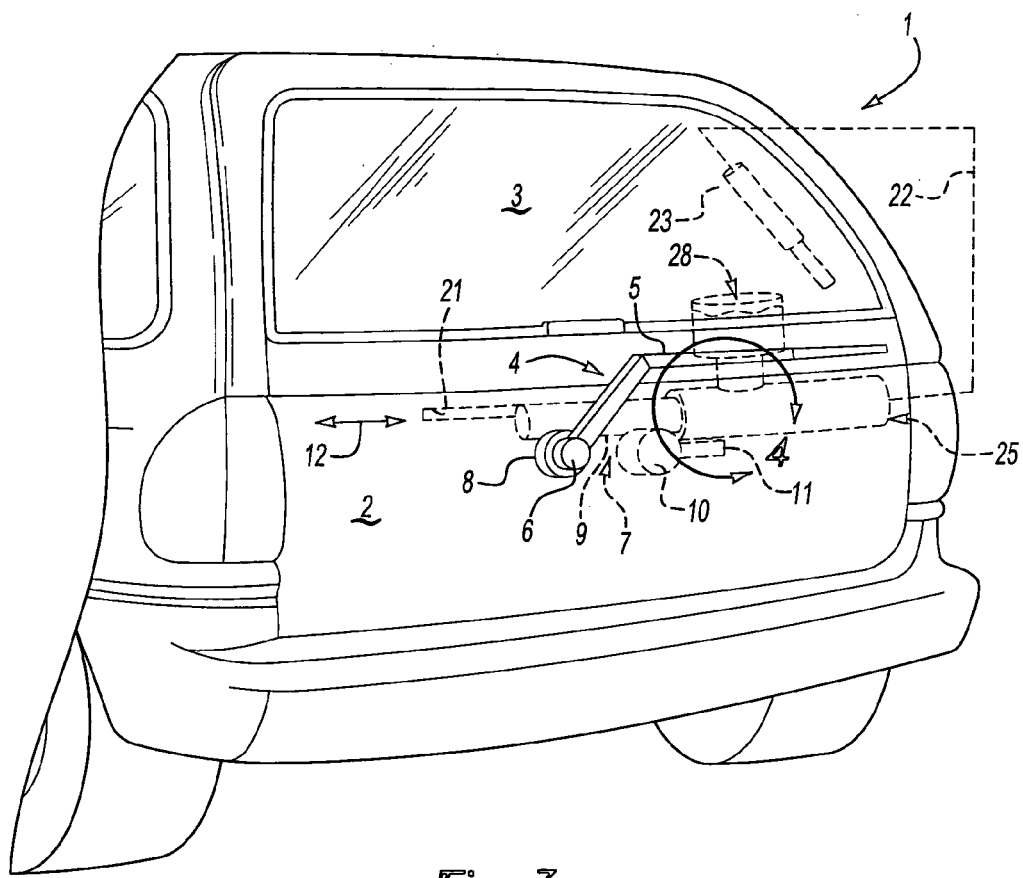
FIGS. 3 and 4 show representations corresponding to FIGS. 1 and 2 with a modified hydraulic system for a servo-actuator that can be driven virtually without power when not under load.
Figure 4:
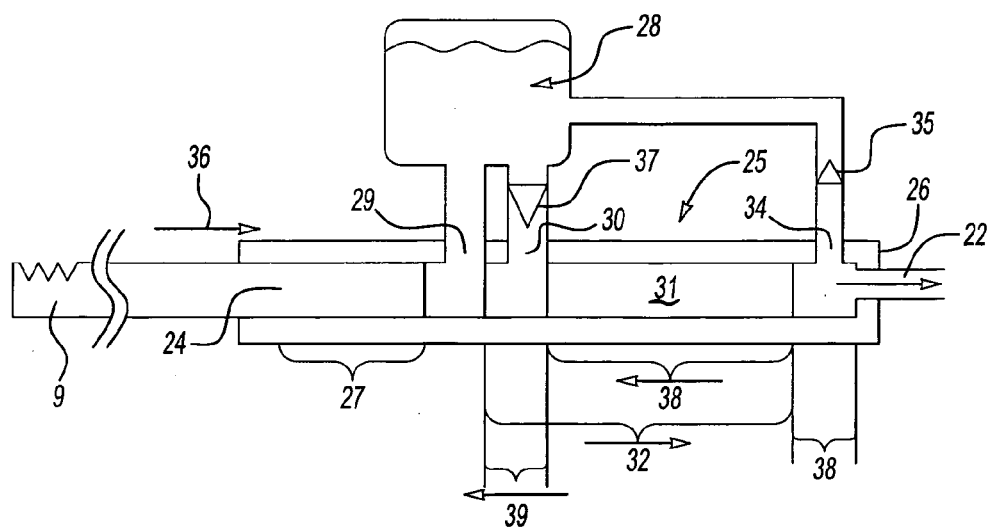

The embodiment of FIGS. 3 and 4 leads to an especially simple overall solution, which affords a high degree of operating reliability, because internal hydraulic leaks can be compensated for by the equalizing reservoir 28 and furthermore, only one hydraulic line 22 is required. In addition, this is also an especially simple way of providing a jamming safeguard, regardless of the possible automatic locking where a simple lock design is used.

The additional effects (jamming safeguard, automatic locking), explained above with reference to FIGS. 3 and 4, can also be achieved in connection with a mechanical coupling connection of FIGS. 1 and 2 if a hydraulic cylinder with assigned equalizing reservoir is used as in FIGS. 3 and 4.

What is claimed is:

1. A drive arrangement for a pivoting windshield wiper for a vehicle, the drive arrangement having a motor-driven drive source reversible in its direction of rotation, and a drive including a rack and a pinion situated in connection to the windshield wiper, the rack being fixed in its axis and wherein the rack forms a drive element, independent of the drive for the windshield wiper, in a range of travel lying outside its range of travel linked to the windshield wiper for an actuator provided in addition to the drive for the windshield wiper, characterized in that the actuator is designed as hydraulic actuator which comprises a master cylinder and a slave cylinder, and wherein the rack forms the drive element for a piston of the master cylinder.

2. The drive arrangement as claimed in claim 1, characterized in that the drive source takes the form of an electric motor reversible in its direction of rotation.

3. The drive arrangement as claimed in claim 1, characterized in that the master cylinder is connected to an equalizing reservoir, which can be shut off in its connection to the cylinder volume of the master cylinder.

4. The drive arrangement as claimed in claim 3, characterized in that the vehicle windshield wiper is assigned to a rear window of a tailgate that can be pivoted by means of the actuator, and that in closing the tailgate a suction connection of the cylinder volume defined by the piston is established towards the equalizing reservoir.

5. The drive arrangement as claimed in claim 4, characterized in that the suction connection comprises a connection cross-section to the cylinder volume, which is situated in the end area of the discharge stroke of the master cylinder.

6. The drive arrangement as claimed in claim 5, characterized in that the connection cross-section is assigned to an upper range of travel of the master cylinder not covered by the piston.

7. The drive arrangement as claimed in claim 4, characterized in that the master cylinder, in the range of travel for actuation of the slave cylinder, has a connection that opens to the cylinder volume when closing the tailgate.

8. The drive arrangement as claimed in claim 7, characterized in that the connection opening to the cylinder volume comprises a connection cross-section to the cylinder volume, the connection cross-section being situated adjacent to a transitional range following on from the range of travel assigned to the windshield wiper drive.

9. The drive arrangement as claimed in claim 7, characterized in that a controlled valve closing in the opposite direction is arranged in the connection opening to the cylinder volume.

10. The drive arrangement as claimed in claim 1, characterized in that the piston of the actuator is detachably connected to the rack.

11. The drive arrangement as claimed in claim 1, characterized in that the rack forms the piston of the master cylinder.

* * * * *